Jan. 20, 1970 H. L. BOWMAN 3,490,687

DOCUMENT SPACING CONTROL APPARATUS

Filed Jan. 3, 1968 3 Sheets-Sheet 1

INVENTOR
HAROLD L. BOWMAN

BY Gerald J. Ferguson Jr.
ATTORNEY

DOCUMENT SPACING CONTROL APPARATUS

Filed Jan. 3, 1968

INVENTOR
HAROLD L. BOWMAN

BY
BY Gerald J. Ferguson Jr.
ATTORNEY

Jan. 20, 1970 H. L. BOWMAN 3,490,687

DOCUMENT SPACING CONTROL APPARATUS

Filed Jan. 3, 1968 3 Sheets-Sheet 3

INVENTOR

HAROLD L. BOWMAN

BY Gerald J. Ferguson Jr.

ATTORNEY

United States Patent Office 3,490,687

Patented Jan. 20, 1970

3,490,687

DOCUMENT SPACING CONTROL APPARATUS

Harold L. Bowman, Fairfax County, Va., assignor to Farrington Electronics, Inc., Springfield, Va., a corporation of Massachusetts Filed Jan. 3, 1968, Ser. No. 695,450
Int. Cl. G06k 1/04, 1/14; B26f 1/04
U.S. Cl. 234—28 15 Claims

ABSTRACT OF THE DISCLOSURE

Apparatus for asynchronously controlling the spacing between documents fed from a document feed apparatus along a document feed path to a punch machine is disclosed. A photocell located at the entry point to the punch detects the presence of documents at this point. It is at this point that the document spacing is controlled. Feedback logic circuitry responsive to the photocell generates signals corresponding to the minimum and maximum desired document spacing. If the next document arrives at the photocell at a time either earlier or later than the desired range of document spacing, appropriate feedback control signals are generated to either increase or decrease, respectively, the document spacing by actuating the document feed apparatus at an appropriate time. Means are also provided for rapidly decreasing the document spacing whenever the spacing is substantially greater than the desired range of document spacings. Also means are provided for accounting for the cycle time of the punch.

BACKGROUND OF THE INVENTION

This invention relates to the data processing field and, more particularly to an apparatus for asynchronously controlling the flow of documents such as cards to apparatus for punching the cards or subjecting the documents to other operations.

The type of cards referred to could be those having X rows and Y columns of data storage positions, one position located at the intersection of each row and column. The card would further contain items of information such as alphanumeric characters, marks, or the like. In known input-output data processing systems of the type described above, cards are usually fed one at a time to a scanning or reading station where the items of information on the card are detected, converted and fed to a buffer stage for temporary storage, the buffer stage output being connected to a card punch station. The card is then transported to the punch station. Several approaches are employed for selectively punching the rows and columns thereby forming a record on the card indicative of the above-mentioned items of information scanned from the card. A large number of such systems operate on a predetermined internal cyclic or synchronous basis—for example, the feed and punch station would be synchronized to process 250 cards a minute, and should one card fail to be fed a minute only 249 cards would be processed and so on. Such a synchronous arrangement is not satisfactory where the card is selectively and intermittingly advanced through the punch station so that, during each cycle of operation of the punch, a different region of the card is presented to the punch pins for perforation thereby. For example, a four column punch may be used and in one operation it might be desirable to only punch the first sixteen columns of a 51 column card, accordingly, the card would selectively and intermittently be advanced to assume four successive positions relative to the punch pins. Further, the cyclic arrangement is also unsatisfactory where the cards are passed through the scanning station at a speed slower than that subsequent to the scanning operation. The latter is evident, when a larger area of the card has to be scanned, thereby increasing the period of the scanning operation, slowing down the overall average speed of the card being transported to the punch station. With the above in mind, it would be more desirable to control the frequency at which the cards are advanced from the feed station on an asynchronous basis.

SUMMARY

The primary purpose of this invention is to provide optimum card spacing between traveling documents in a data processing system of the type described above.

Another object of this invention is to control document spacing in a data processing system on an asynchronous basis.

Another object is to control the document spacing by utilizing feedback signals developed at a particular point along the document travel path.

Other objects and advantages of this invention will become apparent upon reading the following detailed description and the attached drawings.

DETAILED DESCRIPTION OF A PREFERRED EMBODIMENT OF THE INVENTION

Figure 1:
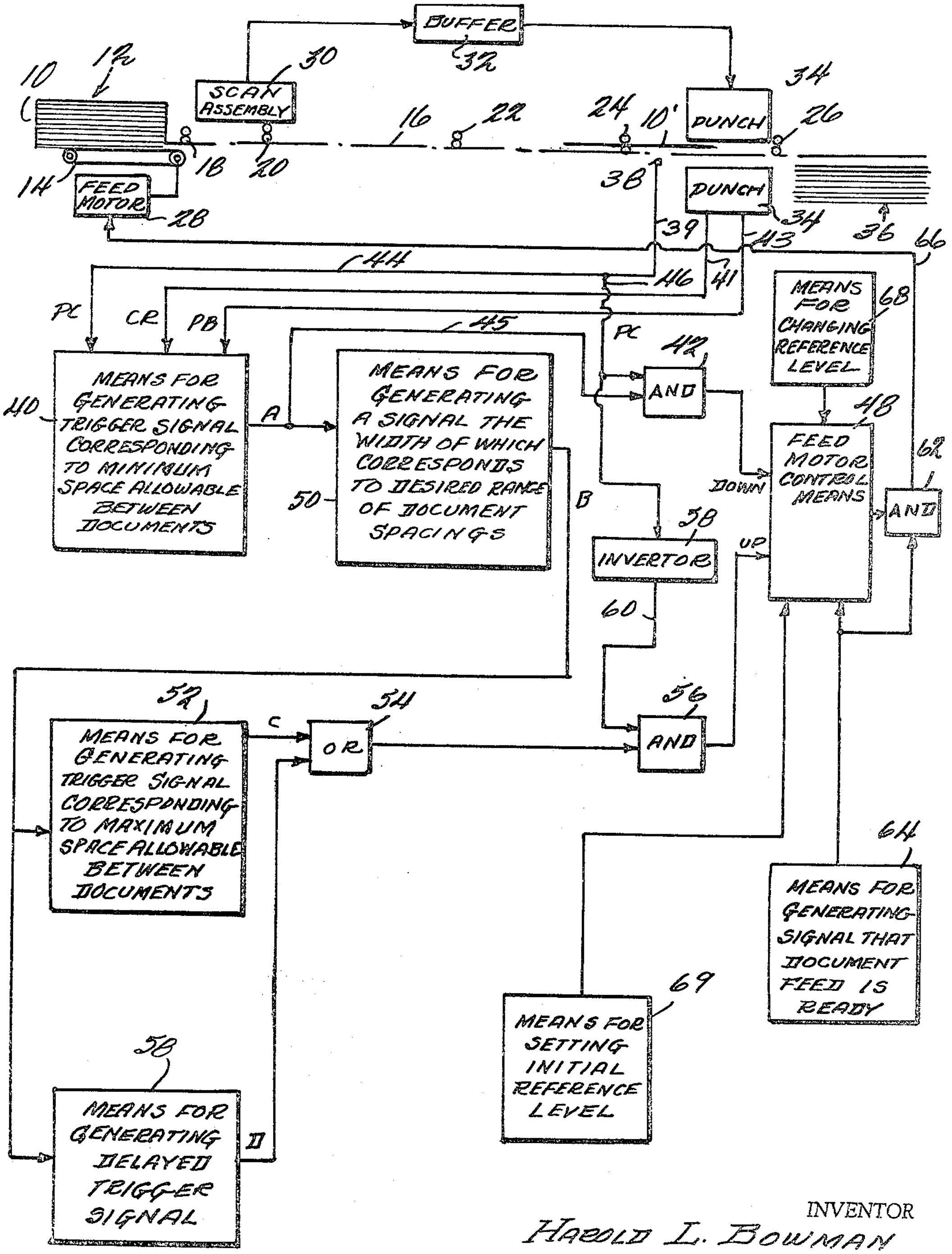
FIGURE 1 is a block diagram of an illustrative overall system employing the principles of the invention.

Referring to the drawings, wherein the reference characters designate corresponding parts throughout the several figures, a typical data processing system with which the present invention would be utilized is schematically shown in FIGURE 1 comprising documents 10 arranged in a stack in an input hopper area 12 from where the documents are to be sequentially fed by a feed belt 14 located adjacent thereto through a transport path 16 along which are located several pairs of roller assemblies 18–26. A feed mechanism or motor 28 is aperiodically energized for activation of the feed belt 14 to thereby feed the documents from the input hopper 12. The feed mechanism could typically include a continuously running drive mechanism to which coupling means are connected, the coupling means being actuated whenever a document is to be fed to the transport path. Typically, the coupling means may be a clutch, or a solenoid which relaxes and permits a slip coupling to turn, or a valve which applies vacuum through ports. A scan assembly unit 30 is so positioned further along and adjacent the document path 16 to define a scanning station area for the scanning of items of information from the documents, the information being stored in a buffer 32 connected from the scan assembly unit 30.

Still further along and also adjacent document path 16 is a punch connected from buffer 32, and mechanism 34, defining a punch station where the document 10' entering thereat is selectively and intermittently advanced whereby subsequent to each step of the advancement of the document, several columns are simultaneously punched on document 10'. After the document 10' is ejected from the punch station it is transported to a stack of documents 10' located at an output hopper area 36.

In order that a synchronous control may be exercised over the spacing of the documents such as cards fed from station 12 to the punch 34, a photocell diagrammatically indicated at 38 is provided at the entry point into the punch 34. Typically, this point comprises the stop gate (not shown) of the punch. The photocell 38 provides signals over the line 39 to indicate the presence or absence of a card at the stop gap photocell. The photocell signal (PC) is applied to electronic circuitry which is indicated in block diagram form in FIGURE 1. This circuitry will be described in more detail hereinafter with respect to FIGURE 2. The punch 34 provides control signals CR and PB over lines 41 and 43 respectively. The CR line indicates the card ready status of the punch. In particular, this means that a card is adjacent the stop gate of the punch, that the means which moved the card to the stop gate have been deactivated, and that the stop gate has been lowered thereby indicating that the card is ready to be punched. The above elements of the card punch are typical and a description thereof is not deemed pertinent to the description of the instant invention in that they form no part thereof. The signal indicates that the punch 34 has begun punching.

Figure 3:
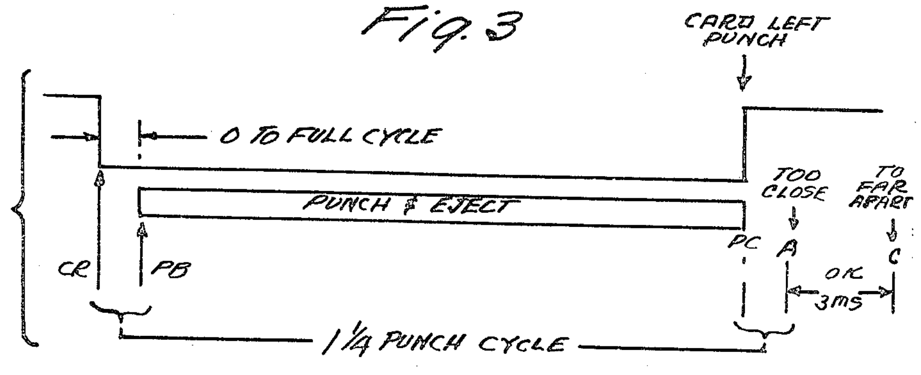
FIGURE 3 is a diagram which indicates the time of occurrence of various signals of FIGURES 1 and 2.

Referring to FIGURE 3 the time of occurrence of the PC, CR, and PB signals is indicated. A time period between the CR and PB signals, is variable and depends upon which part of the punch cycle the punch 34 is in when the card ready signal is generated. In other words, available punch apparatus operates on a cyclic basis and even though a card might be ready for punching, the punch cannot do anything about it until its punch mechanism is in the appropriate part of its cycle to perform the punch function. Thus, if the punch apparatus is in a portion of its cycle three-quarters removed from that point in its cycle where it can perform the punch operation when the card ready signal is generated, the three-quarter portion of the punch cycle must elapse before punching can commence. Thus, the time period between the CR and PB signals can vary between a negligible amount of time and a full cycle of the punch apparatus. For purposes of illustrating the invention, a typical punch cycle is twelve milliseconds.

Figure 4:
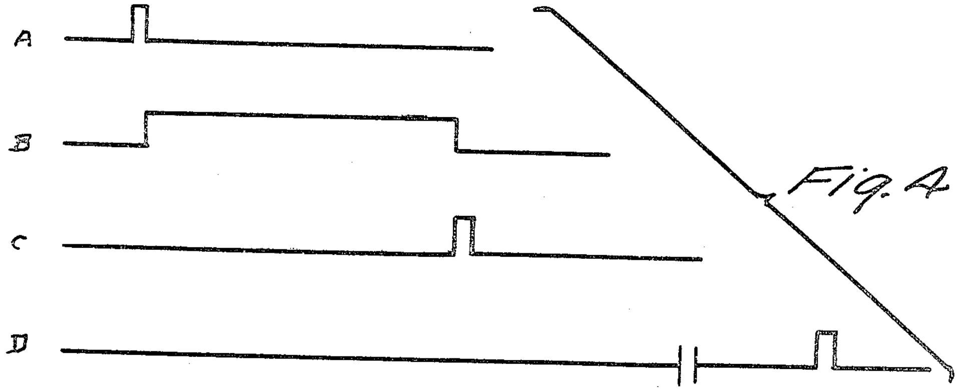
FIGURE 4 illustrates the waveforms of some of the signals of FIGURE 3.

After the initial period between card ready and the alignment of the punch apparatus, the punch and eject portion of the punch apparatus operation is performed as indicated in FIGURE 3. This period of time required for this portion of the punch operation is variable and depends on the number of punched columns of the card. After this period is over, the punched card will be ejected from the machine whereby a change in the level of the output signal from the photocell 38 will occur, the signal being applied over line 44 and indicated as PC in FIGURES 1 and 3. Upon ejection of the card from the punch, a second variable period of time commences. The extent of this period of time is such as to force the first variable period of time which elapses between the CR and PB signals, discussed hereinbefore, and the second period of time to be equal to a constant value approximately equal to 1¼ punch cycles plus some optional, fixed time period. Thus, if the punch cycle is 12 milliseconds as assumed hereinbefore, the first and second variable periods of time are forced to equal 15 milliseconds plus 5 milliseconds corresponding to the optional time period or 20 milliseconds. Hereinafter, it will be assumed, for purposes of illustration that the minimum desired spacing is 15 milliseconds thereby disregarding the optional fixed time period of 5 milliseconds. Circuit means 40 of FIGURE 1 accomplishes this and at the end of the 15 millisecond period, a trigger pulse is generated corresponding to the minimum spacing allowable between documents at photocell 38. This pulse is shown in FIGURE 4A and it is indicated as A in FIGURES 1 and 3. This pulse is applied to AND gate 42 over line 45 together with a signal from photocell 38. At this point it should be noted that photocell 38 serves a dual purpose as diagrammatically indicated in FIGURE 1. Thus, over line 44 is applied the photocell signal indicating that a card has left the punch 34. However, over line 46 a further signal is developed at the photocell indicating that the next card has arrived at the stop gate of the punch 34. It is this signal which is applied to AND gate 42 together with the signal from the circuit means 40. Thus, if lines 45 and 46 are energized at the same time, this indicates that the spacing between the documents at photocell 38 is less than is desired and AND gate 42 will be conditioned to apply a pulse to feed motor control means 48, the effect of which is to increase the spacing between the documents at photocell 38. The operation of control means 48 will be described in more detail hereinafter.

It should be noted that the spacing between the documents is controlled with respect to but a single point along the document feed path—that is the point located adjacent the stop gap phocell 38. It is at this point that the documents tend to come closest together during their travel through path. And thus, this point has been selected as the control point; however, other points along the path may be chosen if so desired.

Assuming that the next card had not arrived at stop gate photocell 38 when pulse A is generated by circuit means 40, the following sequence of events occur to determine whether the next card arrives at such time that the spacing between the documents is within the desired range of spacings or greater than the maximum desired spacing. Thus, the trigger signal from circuit means 40 is also applied to circuit means 50 which generates a pulse signal (see FIGURE 4B), the width of which coresponds to the desired range of document spacings. For the above mentioned desired minimum spacing of 15 milliseconds, a 3 millisecond range of desired spacings is typical and preferred. Hence, document spacings between 15 and 18 milliseconds at photocell 38 do not affect the control means 48. As shown in FIGURE 1, the 3 millisecond pulse generated by circuit means 50 is applied to circuit means 52 which is responsive to the trailing edge thereof to generate a trigger indicative of or corresponding to the maximum spacing allowable between the documents. This signal occurs at point C shown in FIGURES 1 and 3. This signal is applied to OR circuit 54 and thence to AND circuit 56. Also applied to AND circuit 56 is the output of inverter 58 which is responsive to the output of photocell 38. When energized, the output of inverter 58 indicates that the next card has not yet arrived at the photocell 38. Thus, if the inverter output is energized when the output trigger of circuit means 52 occurs, AND gate 56 passes the trigger which in turn, forces the document spacing between the documents to be lessened in a manner which will be described in more detail hereinafter with respect to FIGURE 5.

If the output of inverter 58 is not energized, this means that the next card has arrived at the stop gate photocell 38 and thus the trigger of circuit means 52 is not permitted to pass AND gate 56 and thereby actuate control means 48, this follows since the next card has arrived at the stop gate photocell 38 at such a time as to indicate that the spacing between the documents at the photocell falls within the desired range of spacings.

The output signal from circuit means 50 is also applied to circuit means 58, the purpose of which is to provide the delayed pulse shown in FIGURE 4D. Typically, this pulse occurs 20 milliseconds after the pulse of FIGURE 4C, assuming a desired range of spacings of 15 to 18 milliseconds. The purpose of the pulse of FIGURE 4D is to accelerate control over document spacing whenever the spacing therebetween is much greater than the desired range of spacings. Thus, when the pulse of FIGURE 4D occurs 20 milliseconds after that of 4C the pulse of 4D will not exercise any control over control means 48 unless the next card arrives at the stop gate photocell 38 more than 20 milliseconds after the desired range of spacings of 15 to 18 milliseconds. Hence, if the document spacing is greater than 38 milliseconds, the pulse of FIGURE 4D comes into play and is applied through OR circuit 54 to AND gate 56 and thence to control means 48. As stated above, the inverter 58 output is energized only when the next card has not arrived and thus the pulse of FIGURE 4D is effective only when this line is energized which means the document spacing is 38 milliseconds or more.

Figure 5:
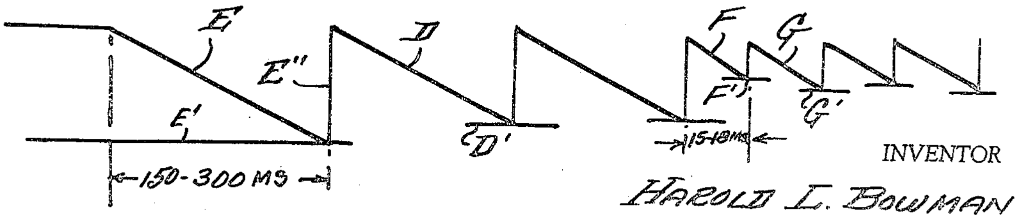
FIGURE 5 illustrates typical waveforms of the signals occurring in one of the elements of FIGURES 1 and 2.

Reference should now be made to FIGURE 5, the waveforms of which illustrate the operation of control means 48. Essentially, function of control means 48 is that of a comparator circuit, the threshold or reference level of which is continuously adjustable. An article "Electronic Reader Sorts Mail" by A. I. Tersoff in the July, 1958, issue of Electronics Industries, pp. 56–60 describes a comparator circuit (FIGURE 5) which with obvious modifications, may be used in the present invention.

Within the block 48 is circuitry which generates a sweep voltage as indicated in FIGURE 5. Also indicated in FIGURE 5, is a series of horizontal lines which indicate the variable threshold values of the circuit. The initial sweep E of the FIGURE 5 waveform is typically 150 milliseconds long for 51 column cards and 300 milliseconds long for 80 column cards. The reference voltage E′ corresponding to sweep E is initially set so that the sweep extends over the full 150 milliseconds shown in FIGURE 5. When the sweep voltage E reaches the reference voltage E′, a comparator output voltage is generated by control means 48 and applied to AND circuit 62 of FIGURE 1. Also applied to AND circuit 62 is the output signal from circuit means 64 which generates a signal indicating that the document feed apparatus is ready to feed another card. This signal is generated only after certain elements along the document feed path 16 signal that they are finished what they are doing and are ready to accept a further document from the feed apparatus. The elements for generating such a signal are not part of this invention and thus no detailed description thereof will be given. Thus, circuit means 64 generates a signal whenever the document feed apparatus is ready to feed another card. Hence, when the signals from control means 48 and circuit means 64 are applied to AND gate 62, a control signal is applied over line 66 to feed motor 28 to cause another document to be fed down the document feed path.

The signal generated by circuit means 64 not only conditions AND gate 62 but also is applied to control means 48 to reset the sweep as indicated at E″ in FIGURE 5. The sweep immediately recommences as shown at D. However, the reference voltage D′ corresponding to sweep D has been raised with respect to E′ and thus the amount of time required for sweep D to intersect D′ will be less than that required for sweep E to intersect reference E′ since the sweep slopes remain constant. Hence, it can be seen that the spacing between the documents at photocell 38 tends to be lessened with each succeeding sweep until the extent of the sweep corresponds to a document spacing at photocell 38 falling within the desired range of 15 to 18 milliseconds as indicated at F in FIGURE 5. As stated hereinbefore, the appearance of an output signal at AND gate 42 has the effect of increasing the spacing between the documents while an output at AND gate 56 increases the document spacing at photocell 38. In particular, the output of AND gate 42 is applied to the terminal indicated DOWN on control means 48. In other words, the AND gate 42 output causes the reference levels of FIGURE 5 to be moved downwardly thereby increasing the length of time required for the corresponding sweep to intersect or reach the reference level and thereby generate the signal which conditions AND gate 62, which, in turn, causes feed motor 28 to feed another card when the next card is ready to be fed. Correspondingly, the effect of an output signal occurring at AND gate 56 is such as to move the reference level up and thereby decrease the spacing between the documents at photocell 38.

Control means 48 has associated therewith means 68 which tend to cause the reference levels to move downwardly very slowly and thereby cause the documents spacing to very gradually increase. Thus, any tendency for the documents to bunch at photocell 38 is reduced. This is indicated in FIGURE 5 at G′. Thus, it can be seen then that G′ is below F′ thereby causing sweep G to be longer than F. Control means 48 also has associated therewith means 69 for establishing an initial reference level other than E′ of FIGURE 5 which as stated before is typically 150 or 300 milliseconds depending on whether 51 or 80 column cards are being punched. Thus, if only certain columns are being punched, the number of which is substantially less than the total number of columns in the card, means 69 is employed to set the initial reference level such that it corresponds to the number of columns being punched.

Figure 2:
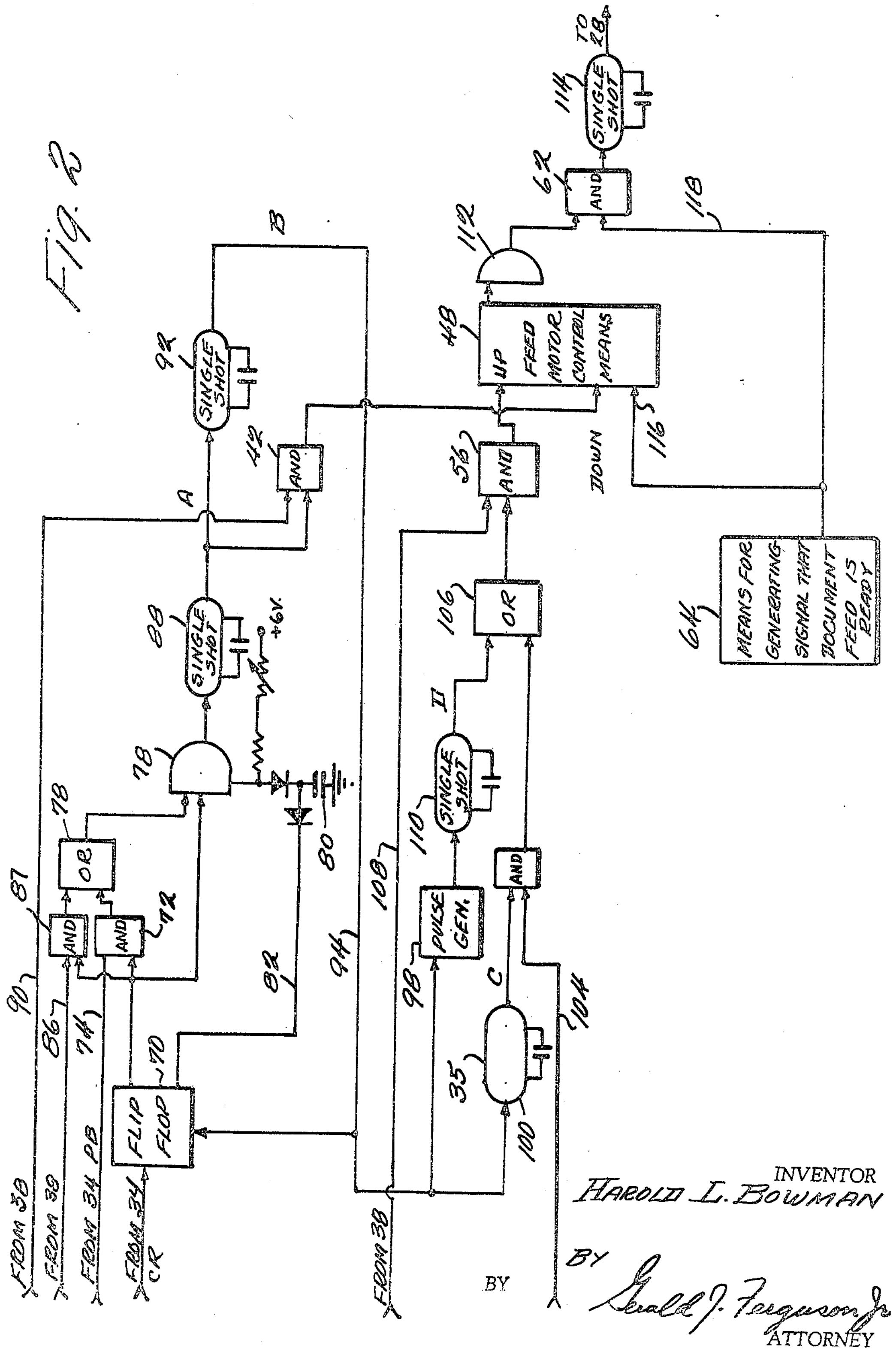
FIGURE 2 is a schematic diagram of the feedback circuitry of FIGURE 1.

Having now described the structure and operation of the invention in terms of the block diagram of the overall system of FIGURE 1, a more detailed description of the electronic circuitry will now be given with respect to FIGURE 2. Circuit means 40 of FIGURE 1 includes a flip-flop 70 to which is applied the card ready or CR signal. One of the flip-flop output signals is applied to AND gate 72 together with another signal from line 74 which signal corresponds to the punch begin or PB signal. The PB signal is inverted as indicated in FIGURE 2 and thus the output of the AND circuit 72 is energized upon the occurrence of the CR signal and is applied to OR circuit 76. The output of OR circuit 76 is applied to a circuit 78 the effect of which is to act as a comparator The comparator 78 is similar in operation to the comparator 48 of FIGURE 1 with the basic difference being that the reference or threshold level thereof remains constant. The sweep capacitor 80 for circuit 78 is charged by the output voltage applied from OR circuit 76. The effect of the output from flip-flop 70 applied over line 82 is such as to prevent the charging of capacitor 80 until the flip-flop 70 has been turned on. Thus, capacitor 80 starts charging as soon as the card ready signal appears. When the punch begin signal occurs the level at line 74 is changed and the corresponding level at the output of AND circuit 72 is also changed thereby removing the charging voltage for capacitor 80 from the output of OR circuit 76. Hence, at this time the capacitor 80 contains a charge corresponding to the variable period of time indicated in FIGURE 3 between the CR signal and the PB signal, this period of time corresponding to the amount of time it takes the punch apparatus to line up its punch mechanism after the card ready signal has occurred. The charge on capacitor 80 is retained thereon during the punch and eject portion indicated in FIGURE 3. When the card leaves the punch this is detected as described hereinbefore by the stop gate photocell 38 and a signal is generated which is applied over line 86 to AND circuit 87, to which is also applied the output of flip-flop 70. An output signal from AND circuit 87 occurs and is applied to OR circuit 76 and thus the output of OR circuit 76 is once again energized to recommence the charging of capacitor 80. When the capacitor is charged to a level corresponding to 15 milliseconds of time as determined by the RC time constant of the capacitor and its associated resistance, an output signal is generated by comparator 78 and applied to single shot 88 which generates a 50 microsecond pulse which is shown in FIGURE 4A, the letter A also being shown in FIGURE 2. Thus, the charge rate of capacitor 80 and the reference level of comparator 78 are such as to maintain the sum of the variable time between (1) signals CR and PB and (2) PC and A equal to 15 milliseconds or more generically 1¼ punch cycles where for the purposes of this illustrative description of the invention the punch cycle is assumed to be 12 milliseconds.

The output pulse from comparator 78 is applied to AND circuit 42 which is also indicated in FIGURE 1. If the next card arrives at stop gate photocell 38 prior to the generation of the comparator 88 pulse, AND gate 42 will be energized causing the 50 microsecond pulse from signal shot 88 to be applied to control means 48 thereby decreasing the level of the reference voltage associated therewith and increasing the amount of spacing between the documents which are fed from the feed apparatus 28.

The output signal from single shot 88 is also applied to single shot 92 which generates a pulse, the width of which is 3 milliseconds and which defines that range of desirable document spacing at photocell 38. Although 3 milliseconds has been chosen for this illustrative example of the invention, it is to be understood that the particular range of desired spacing depends on the particular application. The three millisecond signal is shown in FIGURE 4B and it is indicated as occurring at B in FIGURE 2. It is applied over line 94 to the reset input of flip-flop 70, pulse generator 98, and single shot 100. Single shot 100 is responsive to the trailing edge of the FIGURE 4B pulse to generate a 35 microsecond pulse which is shown in FIGURE 4C and it occurs at the point C of FIGURE 2. The FIGURE 4C pulse is applied to AND circuit 102 which determines whether the card being processed by the system is a 51 or 80 column card. If it is a 80 column card, the input applied over line 104 is such as to prevent any output from occurring at AND gate 102. However, if it is a 51 column card, the pulse of FIGURE 3C will be applied to OR gate 106 and thence to AND gate 56 which is indicated in FIGURE 1. Also applied to AND gate 56 over line 108 is a line responsive to the stop gate photocell 38 which indicates that the next card has not yet arrived at the photocell and thus line 108 signal causes AND gate 56 to be energized which in turn causes the 35 microsecond pulse generated at single shot 35 to be passed through AND gate 56 and applied to control means 48 to thereby move the reference level thereof upwardly and thereby decrease the spacing between the documents in the manner described hereinbefore. However, if a document has arrived at the stop gate photocell 38, line 108 will not be energized and thus AND gate 56 will not deliver any pulse to the control means 48. Hence, the reference level of control means 48 will remain essentially constant.

As stated before, the FIGURE 4B signal is also applied to pulse generator 98, which generates a pulse having a length of 20 milliseconds commencing substantially immediately after the three millisecond interval established by the pulse output of signal shot 92. The 20 millisecond pulse is applied to single shot 110 which is responsive to the trailing edge of the pulse and at which time generates a 50 microsecond pulse which is applied to OR circuit 106 and thence to AND gate 56. If the next card has not yet arrived at the stop gate photocell, the 50 microsecond pulse generated by single shot 110 will be applied through AND gate 56 to thereby further decrease the spacing between the documents. It can be sen that for 51 column cards, the path defined by pulse generator 98 and single shot 110 in effect acts as a means for accelerating the decrease of spacing between the documents whenever the spacing there-between is substantially greater than the desired 15 to 18 millisecond range of desired spacings.

It should be further noted that this last mentioned path operates both for 51 and 80 column cards whereas the path defined by single shot 100 and OR circuit 102 operates only for 51 column cards. Hence, for 80 column cards the effective desired range of values for document spacings is 23 milliseconds wide. That is, it extends from 15 to 38 milliseconds of document spacings. Further, for 80 column cards the paths defined by pulse generator 98 and single shot 110 does not act as an accelerating means for decreasing the spacing between the documents.

As stated hereinbefore with respect to FIGURE 5, an output signal is generated by control means 48. This is applied to AND circuit 62 through an inverter 112 the purpose of which is to sharpen up the transition of the signal generated by control means 48 so that single shot 114 will have a sufficiently sharp actuating trigger if the output of control means 48 causes single shot 114 to trigger. Circuit means 64 generates a signal indicating that the document feed apparatus is ready to feed a card and this signal is applied, as described hereinbefore, (1) to the reset input terminal of control means 48 over line 116 and (2) to AND circuit 62 over line 118. Thus, when both of the inputs of AND circuit 62 are conditioned, a trigger signal for single shot 114 is developed which in turn produces a 50 microsecond pulse or feedback control signal which is applied to the feed motor 28 to cause it to feed another document down to transport path.

Numerous modifications of the invention will become apparent to one of ordinary skill in the art upon reading the foregoing disclosure. During such a reading it will be evident that this invention provides unique circuitry for accomplishing the objects and advantages hereinstated. Still other objects and advantages, and even further modifications will be apparent from this disclosure. It is to be understood, however, that the foregoing disclosure is to be considered exemplary and not limitative, the scope of the invention being defined by the following claims.

What is claimed is:

1. Apparatus for asynchronously controlling the spacing between documents fed from a document feeding apparatus along a transport path to a document processing station, said apparatus comprising:
   means for sequentially detecting the presence of said documents at a point located along said transport path;
   means responsive to said detecting means for generating at least one signal corresponding to the desired range of spacings of said documents;
   mean responsive to said signal corresponding to the desired range of spacings for generating a feedback control signal whenever the document spacing at said point is not within said desired range, said feedback control signal being applied to said document feeding apparatus to control the feeding of documents therefrom on an asynchronous basis.

2. Apparatus as in claim 1 where said means for generating at least one signal corresponding to the desired range of spacings includes:
   means responsive to said detecting means for generating a signal corresponding to the desired minimum spacing of documents at said point;
   means responsive to said minimum desired spacing signal for generating a signal corresponding to the desired range of spacings of said documents;
   means responsive to said signal corresponding to the desired range of spacings for generating a signal corresponding to the maximum range of spacings; and
   means responsive to said last three mentioned means for generating first and second signals, said first signal being indicative of the fact that the document spacing at said point is less than said desired minimum spacing and said second signal being indicative of the fact that the document spacing at said point is greater than said maximum desired spacing, said feedback control signal generating means being responsive to said first and second signals.

3. Apparatus as in claim 2 including means responsive to said means for generating a signal corresponding to the desired range of spacings for generating a third signal whenever the spacing between said documents at said point is substantially greater than said maximum desired spacing to thereby cause the spacing between said documents to be rapidly decreased to said desired range of spacings.

4. Apparatus as in claim 3 where said means for generating the feedback control signal includes (1) a comparator, the threshold level of which is adjustable, said threshold level being adjusted whenever said first, second, or third signal is applied thereto, and (2) means for generating a sweep signal which is applied to said comparator whereby said control feedback signal is generated when said sweep reaches said threshold level.

5. Apparatus as in claim 4 including means for establishing the initial threshold level of said comparator so that the value thereof corresponds to the amount of processing performed at said document processing station.

6. Apparatus as in claim 5 including means for gradually changing or slowly changing the threshold level of said comparator over a relatively long period of time whereby the spacing between said documents tends to increase.

7. Apparatus as in claim 6 including means for generating a signal indicating that said document feed apparatus is ready to feed another document and means responsive to said last mentioned means and said comparator for generating said feedback control signal.

8. Apparatus as in claim 1 where said document processing station comprises a synchronous card punch and where said point along the transport path is located at the entry point to said punch.

9. Apparatus as in claim 8 where said signal corresponding to the minimum desired spacing between said documents at said point is generated no more than a predetermined time interval after each card is ejected from the punch, said predetermined time interval being mathematically related to the punch cycle of the punch.

10. Apparatus as in claim 9 where said predetermined time interval is 1¼ punch cycles.

11. Apparatus for asynchronously controlling the spacing between documents fed from document feed apparatus along a transport path to a document processing means, said apparatus comprising:

means for sequentially detecting the presence of one of said documents at a point located along said transport path;

first indicating means responsive to said detecting means for indicating that said one document has moved away from said point;

means responsive to said first indicating means for generating a signal corresponding to the minimum desired spacing of the documents at said point;

second indicating means responsive to said detecting means for indicating that the next card after said one card has arrived at said point;

means responsive to said second indicating means and said minimum desired spacing signal for generating a first signal whenever the spacing at said point between said one document and said next document is less than said minimum desired spacing;

means responsive to said minimum desired spacing signal for generating a signal, a characteristic of which corresponds to a desired range of spacings between said document at said point;

means responsive to said last mentioned signal for generating a signal, a characteristic of which corresponds to the maximum desired spacing between said documents at said point;

means responsive to said second indicating means and said signal corresponding to the maximum desirable spacing for generating a second signal whenever the spacing at said one point between said one document and said next document is greater than said maximum desired spacing; and means responsive to said first and second signals for generating a feedback control signal which is applied to said document feed apparatus to control the spacing of documents on an asynchronous basis at said point.

12. Apparatus as in claim 11 including means responsive to said signal corresponding to the desired range of spacings for generating a signal which occurs a predetermined time interval after the said signal corresponding to the desired range of spacings, said signal being applied to said means for generating said second signal whereby said last-mentioned means generates a third signal whenever the spacing between said documents is greater than said maximum desired spacing by said predetermined time interval to thereby accelerate the decrease of document spacing whenever it is substantially greater than the desired range of spacings.

13. Apparatus as in claim 11 where said document processing station comprises a synchronous card punch and where said point along the transport path is located at the entry point to said punch.

14. Apparatus as in claim 13 where said signal corresponding to the minimum desired spacing between said documents at said point is generated no more than a predetermined time interval after each card is ejected from the punch, said predetermined time interval being mathematically related to the punch cycle of the punch.

15. Apparatus as in claim 14 where said predetermined time interval is 1¼ punch cycles.

References Cited

UNITED STATES PATENTS

| | | | |
|---|---|---|---|
| 3,212,622 | 10/1965 | Metz | 198—34 |
| 3,311,224 | 3/1967 | King | 198—34 X |
| 3,347,348 | 10/1967 | Flint et al. | 198—34 X |
| 3,355,592 | 11/1967 | Muir | 198—34 |

WILLIAM S. LAWSON, Primary Examiner

U.S. Cl. X.R.

83—74; 198—34; 234—128